United States Patent [19]

Turgeon et al.

[11] Patent Number: 5,433,395
[45] Date of Patent: Jul. 18, 1995

[54] TAPE CARTRIDGE RETENTION INTERLOCK

[75] Inventors: Thomas A. Turgeon, Fridley; Lawrence A. Flor, Anoka, both of Minn.

[73] Assignee: Minnesota Mining and Manufacturing Company, St. Paul, Minn.

[21] Appl. No.: 106,314

[22] Filed: Aug. 13, 1993

Related U.S. Application Data

[63] Continuation of Ser. No. 818,492, Jan. 8, 1992, abandoned, and a continuation-in-part of Ser. No. 353,826, May 18, 1989, abandoned.

[51] Int. Cl.⁶ .................. G11B 23/107; G11B 15/67
[52] U.S. Cl. ..................... 242/336; 242/345; 360/132
[58] Field of Search ............. 360/132, 95, 94, 96.1; 242/195, 197, 198, 199, 336, 345

[56] References Cited

U.S. PATENT DOCUMENTS

| Re. 29,976 | 4/1979 | Schoettle et al. | 360/132 X |
|---|---|---|---|
| 3,066,880 | 12/1962 | Bauer et al. | 242/198 X |
| 3,150,840 | 9/1964 | Briskin et al. | 242/198 X |
| 3,197,150 | 7/1965 | Camras | 242/181 X |
| 3,582,014 | 6/1971 | Jorgensen | 242/195 |
| 3,677,494 | 7/1972 | Protus | 242/194 |
| 3,677,497 | 7/1972 | Lowry et al. | 360/132 |
| 3,682,415 | 8/1972 | Ibuchi | 360/132 |
| 3,797,777 | 3/1974 | Hosono et al. | 242/195 |
| 3,800,321 | 3/1974 | Bolick, Jr. | 360/94 X |
| 3,836,096 | 9/1974 | Fukushima et al. | 242/197 |
| 3,900,170 | 8/1975 | Serizawa | 242/198 X |
| 3,900,172 | 8/1975 | Kamaya | 242/195 X |
| 3,934,840 | 1/1976 | Inaga | 242/195 |
| 4,019,695 | 4/1977 | Wharam | 242/199 X |
| 4,168,811 | 9/1979 | Lewis | 242/195 |
| 4,185,307 | 1/1980 | Sato | 360/94 X |
| 4,426,047 | 1/1984 | Richard et al. | 242/197 X |
| 4,432,510 | 2/1984 | Ogata et al. | 360/94 |
| 4,452,406 | 6/1984 | Richard | 242/195 X |
| 4,452,407 | 6/1984 | Ogata et al. | 242/198 |
| 4,470,560 | 9/1984 | Yoneya et al. | 360/94 |
| 4,477,850 | 10/1984 | Ogata et al. | 360/94 |
| 4,477,851 | 10/1984 | Datziel et al. | 360/132 |
| 4,479,618 | 10/1984 | Okada et al. | 242/200 X |
| 4,504,876 | 3/1985 | Nagaoka | 360/94 |
| 4,520,970 | 6/1985 | Rasmussen et al. | 242/195 |
| 4,524,926 | 6/1985 | Nemota et al. | 242/198 X |
| 4,536,810 | 8/1985 | Umeda | 360/94 |
| 4,544,970 | 10/1985 | Ogata | 360/132 |
| 4,554,603 | 11/1985 | Tsuchiya | 360/94 |
| 4,558,384 | 12/1985 | Umeda | 360/132 |
| 4,566,048 | 1/1986 | Tomunaga et al. | 360/94 X |
| 4,567,536 | 1/1986 | Tsuchiya | 360/94 |
| 4,572,460 | 2/1986 | Hertrich | 242/195 X |
| 4,595,962 | 6/1986 | d'Alayer de Costemore d'arc | 360/94 X |
| 4,602,300 | 7/1986 | Ogata et al. | 360/60 |
| 4,622,605 | 11/1986 | Tsuruoka et al. | 360/94 X |
| 4,787,570 | 11/1988 | Nakagome | 242/195 |
| 4,793,569 | 12/1988 | Ohsaki | 242/195 |
| 4,826,101 | 5/1989 | Smith | 242/195 |
| 4,828,201 | 5/1989 | Smith | 242/195 |
| 4,832,284 | 5/1989 | Inoue | 242/195 |
| 4,903,153 | 2/1990 | Inoue | 242/195 |
| 4,920,436 | 4/1990 | Novak | 360/132 |
| 4,922,353 | 5/1990 | Inoue | 242/198 |
| 5,072,325 | 12/1991 | Weeks et al. | 360/132 |

FOREIGN PATENT DOCUMENTS

| 0152693 | 8/1985 | European Pat. Off. . | |
| 0151869 | 10/1985 | European Pat. Off. . | |
| 13945 | 3/1956 | Germany | 360/132 |

*Primary Examiner*—Stuart S. Levy
*Assistant Examiner*—Craig A. Renner
*Attorney, Agent, or Firm*—Merchant, Gould, Smith, Edell,; Welter & Schmidt

[57] ABSTRACT

A tape cartridge having a tape supply reel contained within the cartridge housing. A tape passes through a tape guideway in the cartridge housing and is attached to the tape supply reel on one end and a tape connector on the other end. The cartridge housing contains a single interlock arm pivotally mounted for rotational movement, one end of the arm which is movable into and out of the tape path, while the other end of the arm is movable through a slot in the cartridge housing. The withdrawal of the tape connector from the guideway releases the arm so that a spring can actuate the other end of the arm outwardly into locking engagement within a notch in an external housing.

2 Claims, 4 Drawing Sheets

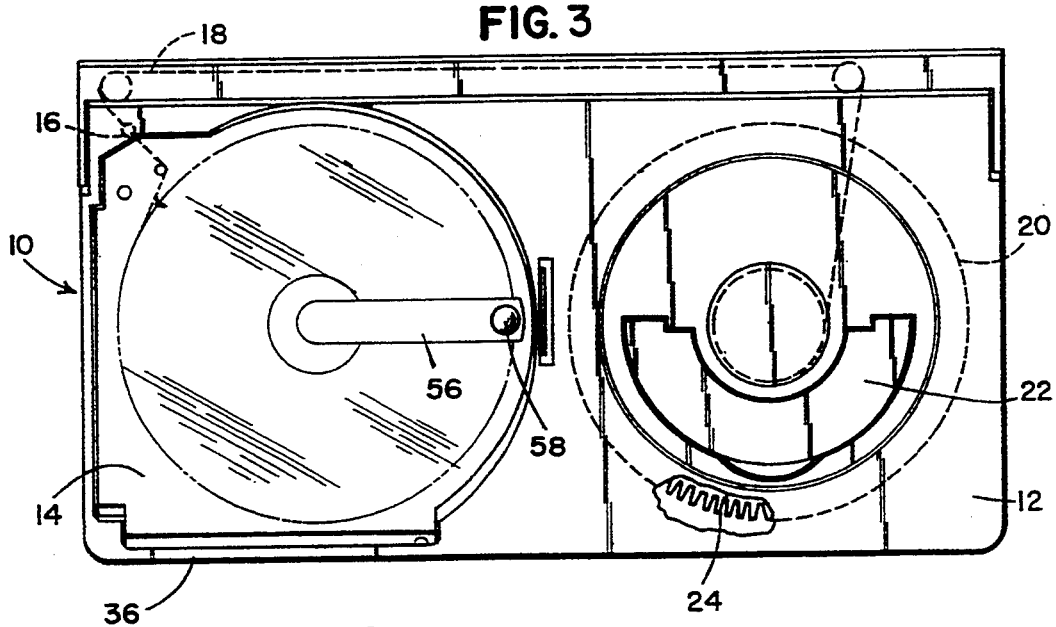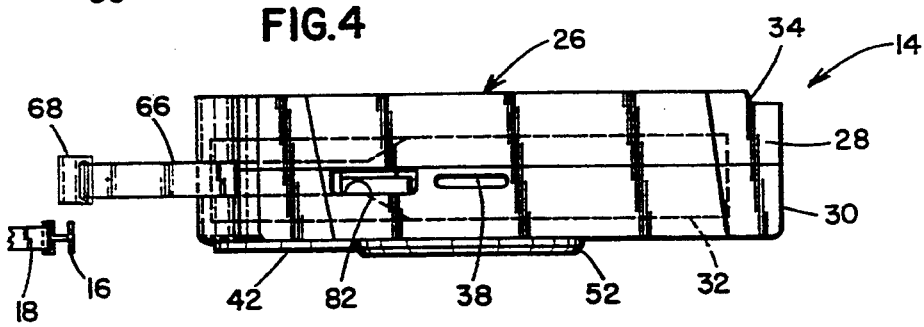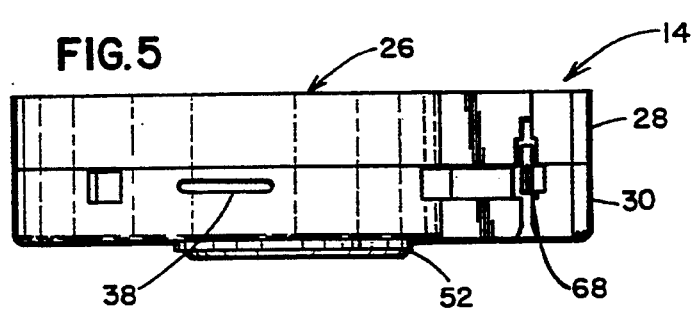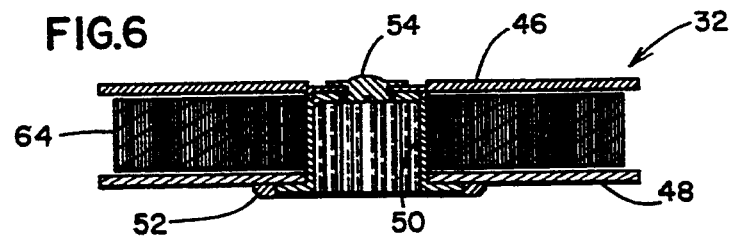

TAPE CARTRIDGE RETENTION INTERLOCK

This is a continuation of application Ser. No. 07/818,492 and 07/353,826, filed Jan. 8, 1992 and May 18, 1989, respectively both abandoned.

TECHNICAL FIELD

The present invention relates generally to magnetic tape cartridges. More particularly, this invention concerns a compact tape cartridge for use with a carrier in order to form a two-piece videocassette which is fully compatible with existing videocassette recorders.

BACKGROUND ART

Videocassette players and recorders (VCRs) have been quite popular and their popularity is expected to continue increasing. One of the reasons for this popularity is the wide variety of programming which is available, either by direct recording for playback and personal use later, or by purchase or rental of prerecorded videocassettes. Such videocassettes are generally available in standardized formats, with the VHS format currently being the most popular. The videocassette itself generally consists of a closed housing. Typically a length of tape connected between two reels is located in the housing and is wound or unwound during play. The tape is generally guided between the reels along a tape path extending along the front edge of the cassette. A pivotal door is usually provided on that edge for protecting the tape. This door is open once the videocassette has been inserted into the VCR.

Conventional videocassettes are not particularly bulky. However, the available storage space is usually limited and so their storage can become a problem as one's collection of videocassettes increases. This problem is expected to worsen with increasing popularity of VCRs and the consequential increasing size of videocassette libraries used with them. As this occurs, we expect that the available space for storage of the videocassettes will at some point have the practical effect of limiting the number of videocassettes which can be kept and used.

Videocassette adapters are available for adapting relatively small cassettes for use with standard formats. Such adapters generally consist of a housing into which the small cassette can be inserted, for example, through a releasable top door. After insertion, a mechanism in the adapter is manually activated to pull the tape out from the supply and take-up reels in the cassette to which it is connected, and guide the tape along the proper path or playback or recording upon insertion of the adapter into the VCR. Such adapters are typically used with small cassettes used in camcorders, but have limited tape capacity and playing time. For example, the small cassettes used with such adapters typically have a maximum playing time of only about twenty minutes versus up to about 2-6 hours (depending upon speed) available with a standard size videocassette. U.S. Pat. Nos. 3,677,494 to Protas, 4,432,510 to Ogata, 4,504,876 to Nagaoka, and 4,567,536 to Tsuchiya are representative of the prior art in this regard. Such adapters do not address the problem of achieving more efficient tape storage without sacrificing capacity and playing time.

The need has thus arisen for a compact tape cartridge which provides the same or better capacity when inserted into a carrier in order to form a standard a videocassette, but which makes for better use of available storage when removed from the carrier.

SUMMARY OF INVENTION

The present invention comprises an insertable tape cartridge which overcomes the foregoing and other difficulties associated with the prior art. In accordance with the invention, there is provided a tape cartridge for use with a carrier. The carrier has a take-up reel. Wherein the cartridge is inserted into the carrier they, together, form a two-piece videocassette which can then be used in the usual fashion. As a consequence, multiple tape cartridges can be stored in the same available space while requiring only one such carrier. The tape cartridge herein provides the same tape capacity, but requires only half the storage space of a standard videocassette.

The tape cartridge includes a housing with a supply reel inside. This reel assembly stores a supply of magnetic tape. One end of the magnetic tape is secured to the reel hub, while the other end extends around a guide pin to a tape connector which is retained in a predetermined position in an opening of the housing for mating engagement with tether connector. The tether connector is located in the carrier. The tether connector is a tether which is attached to is connected to the take-up reel. Insertion of the cartridge establishes a tape tether connection upon insertion of the cartridge into the carrier. A brake mechanism is provided to prevent the tape reel from unwinding when it is not inserted into the carrier. Locating surfaces are provided on the housing to assure proper positioning of the tape cartridge during insertion. In accordance with the preferred construction, an interlock mechanism is provided for releasably securing the tape cartridge against separation from the carrier after insertion of the cartridge into the carrier, completion of the tape connection, and commencement of tape advance.

BRIEF DESCRIPTION OF DRAWINGS

A better understanding of the invention can be had by reference to the following Detailed Description in conjunction with the accompanying Drawings, wherein:

FIG. 3 is an enlarged top view of the two-piece videocassette with the tape cartridge inserted therein;

FIG. 4 is an enlarged side view of the tape cartridge;

FIG. 5 is an enlarged front view of the tape cartridge;

FIG. 6 is cross-sectional view of the tape reel assembly;

DETAILED DESCRIPTION

Figure 1:
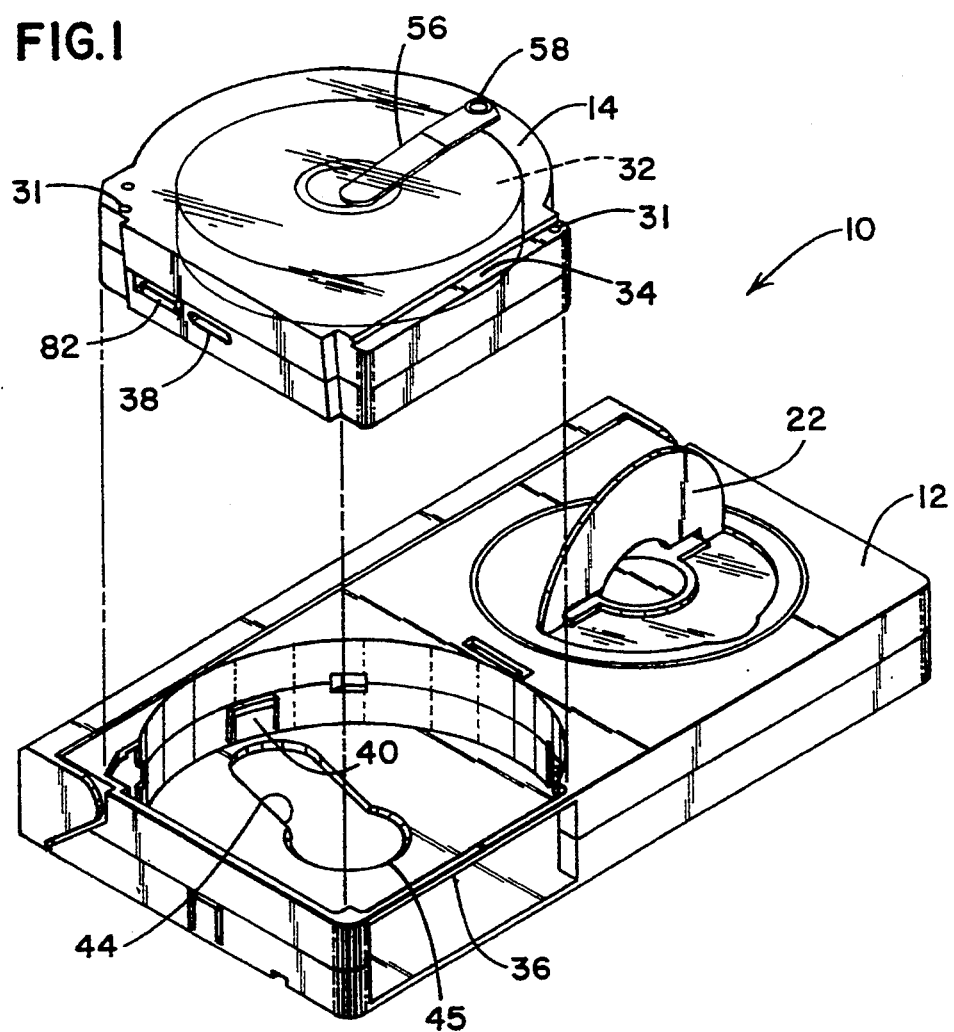
FIG. 1 is an exploded perspective view of a two-piece videocassette incorporating the tape cartridge of the invention.
Figure 2:
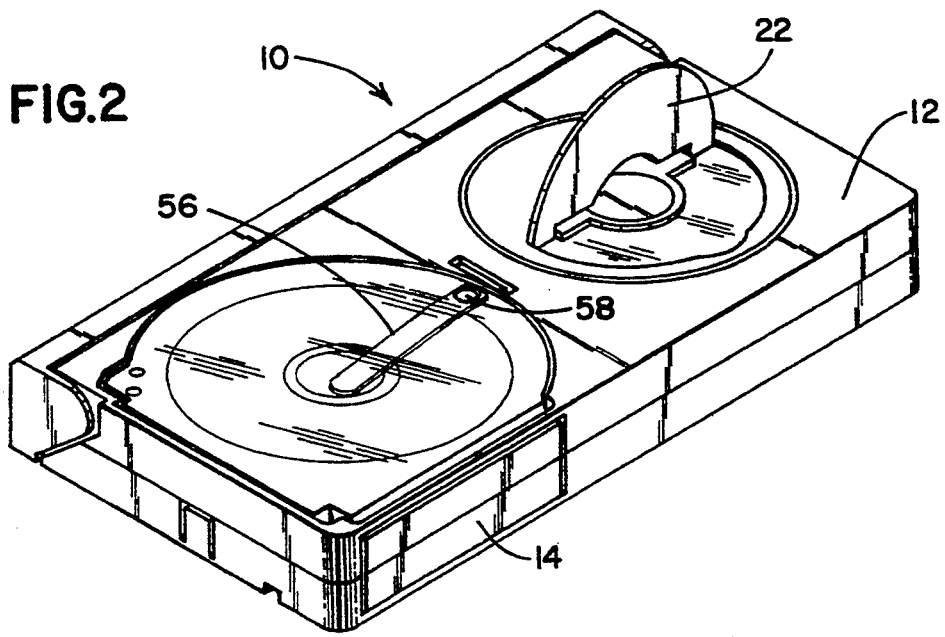
FIG. 2 is a perspective view of the two-piece videocassette with the tape cartridge inserted therein.

Referring now to the Drawings, wherein like reference numerals designate like or corresponding elements throughout the views, and particularly referring to FIGS. 1-3, there is shown a two-piece videocassette 10 comprising a carrier 12 and a removable tape cartridge 14 incorporating the invention. The carrier 12 includes a tether connector 16 secured to one end of a leader or tether 18. The other end of the tether is anchored to the hub of the take-up reel 20. The tape in cartridge 14 can be connected for winding or unwinding in response to manual actuation of pivotal thumb tab 22 by connecting the tape connector 68 to the tether connector 16. FIGS. 1 and 2 show the tab 22 in the up position for winding. The tab 22 is connected to a drive gear 24 which drives gears within the tape cartridge 14, so that rotation of the tab advances the tape connectors toward the take-up reel 20 and establishes the proper tape path within the carrier for playback or recording.

Referring now to FIGS. 4-6, the tape cartridge 14 includes a housing 26 consisting of a top cover 28 and a bottom cover 30 secured together by screws 31. The top cover 28 is preferably substantially clear or transparent so that the tape reel assembly 32 can be seen therein. The housing 26 can be formed of any suitable material, such as plastic.

The tape cartridge 14 includes locating structure to assure proper orientation thereof upon insertion into carrier 12. In particular, the housing 26 is of non-symmetrical configuration for alignment with an opening of similar shape in the top surface of carrier 12. As shown, the tape cartridge 14 includes two adjacent straight sides bounded by a curved side. A notch 34 is provided along the upper edge of one of the straight sides of cartridge 14 for receipt underneath a cross member 36 on carrier 12 in order to retain that side of the cartridge therein. A plurality of recesses 38 are also provided in the other sides of cartridge 14 opposite and adjacent that containing notch 34 for receiving retaining tabs 40, only one of which is shown as best seen in FIG. 1, within the carrier 12. The bottom housing cover 30 also includes an offset raised member 42 which is adapted for flush receipt in the offset portion of hole 44 in the bottom of the carrier 12.

It will thus be appreciated that the cartridge 14 is inserted into carrier 12 by first tilting it in order to place the end with notch 34 under cross member 36 and then pushing it downward completely into the carrier. The cartridge 14 is removed simply by inserting a finger through the offset portion of hole 44 and pushing the end opposite notch 34 upwardly to disengage the remaining tabs 40.

Figure 7:
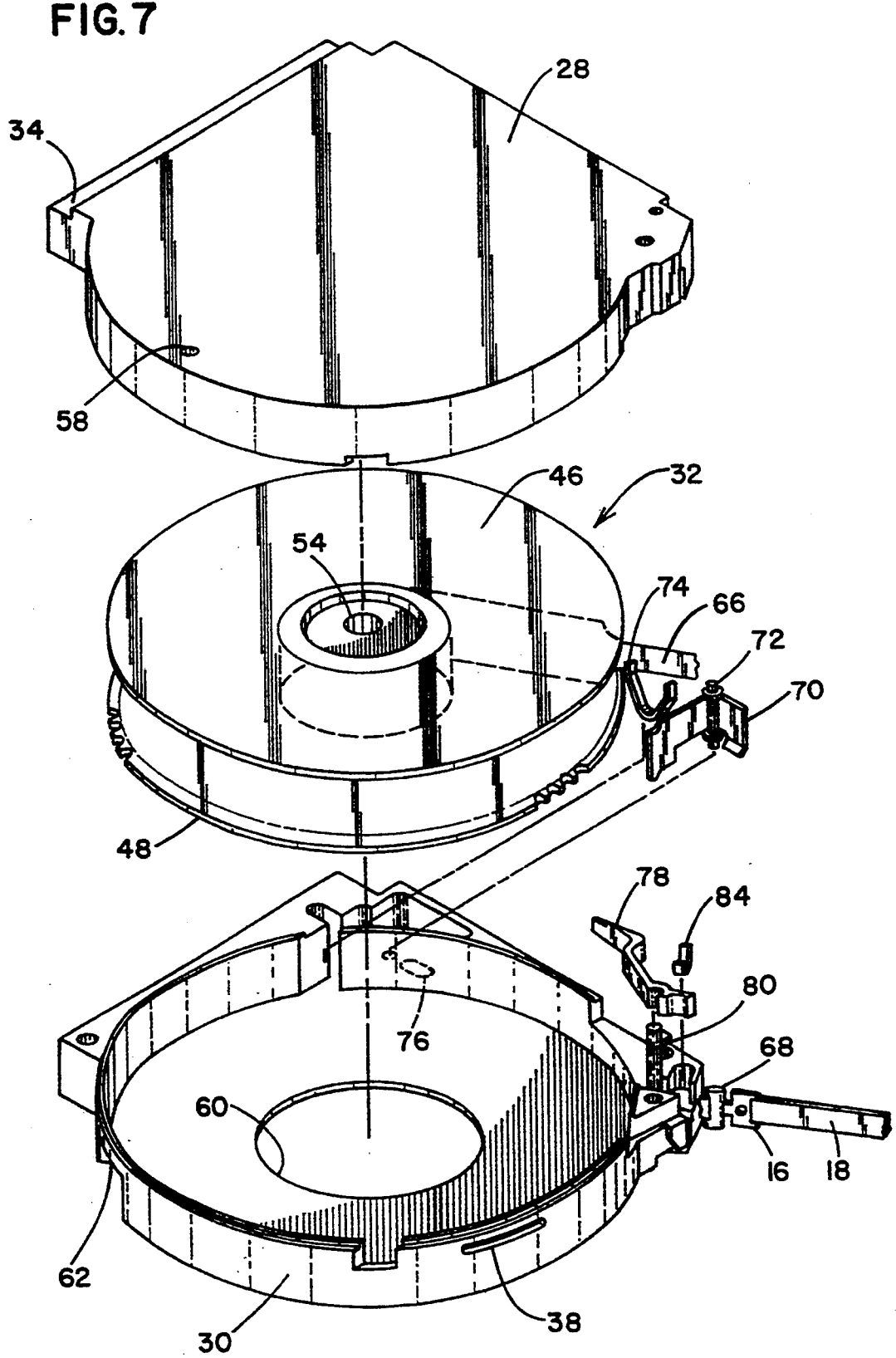
FIG. 7 is an enlarged exploded view of the tape cartridge.

Referring now to FIGS. 6 and 7, the tape reel assembly 32 include a top flange 46 and a bottom gear flange 48. The bottom gear flange 48 includes a central hub 50 which is fixed or preferably integral therewith for rotation in unison. The inside of hub 50 is preferably splined, as is best seen in FIG. 6, for engagement with a drive spindle (not shown) through center holes in the bottom gear flange 48 and bottom cover 30 when the tape cartridge 14 is inserted into the carrier 12 and the carrier has been inserted into the videocassette recorder and lowered into play position. A beveled collar 52 is preferably provided about the underside of hub 50 for cooperation with a beveled central portion of hole 45 in the bottom of the carrier 12, as seen in FIG. 1, for proper alignment with the drive spindle and to maintain appropriate gear center distances. The top flange 46 is secured onto hub 50 by means of a snap button 54. Serrations are provided on adjoining surfaces of flange 46 and hub 50 so that the top flange cannot turn relative to the hub and bottom gear flange 48.

The tape reel assembly 32 is normally urged downwardly within cartridge 14 by a curved leaf spring 56, one end of which bears against button 54 and the other end of which is secured by a heat stake or other suitable connector 58 to the top cover 28. The bottom gear flange 48 thus normally bears against the inside of the bottom cover 30, with collar 52 loosely received within a relatively larger central opening 60 therein so that the hub 50 can be accessed by the drive spindle through hole 45 in the bottom of the carrier 12.

It will thus be appreciated that the tape reel assembly 32 is capable of same limited "floating" movement within the cartridge 14, but is normally urged by spring 56 toward the down position against the bottom housing cover 30. A radial access opening 62 is provided along one side of the cartridge housing 30, as best seen in FIG. 7, so that the tape reel assembly 32 can be driven via a gear (not shown) which is engageable with the bottom gear flange 48 responsive to winding actuation of tab 22 in order to advance the tape from cartridge 14 to the take-up reel 20 within carrier 12 after insertion of the cartridge into the carrier but before insertion of the two-piece videocassette 10 into the recorder.

The tape reel assembly 32 further includes a length of magnetic tape 64 wound around hub 50 between the top and bottom flanges 46 and 48. The length of magnetic tape 64 preferably includes a substantially clear or transparent leader 66 spliced in conventional fashion at each end thereof. For purposes of illustration, only the leader 66 at the outer end has been shown, however, it will be understood that another leader is spliced to the inner end of the tape which in turn is secured at its free end to hub 50 by means of a clip (not shown) or other suitable fastener. The leader 66 at the outer end of tape 64 is secured at its free end to a connector 68, which is adapted for mating engagement with the corresponding connector 16 in carrier 12 upon insertion of the tape cartridge 14. As illustrated, the connectors 68 and 16 comprise mating male and female portions which engage upon insertion of the tape cartridge 14 into the carrier 12.

In accordance with the preferred construction, the leader 66 on the outer end of the magnetic tape 64 transitions to an outer portion of reduced predetermined width which is also of predetermined length for winding receipt onto a reduced portion of the take-up reel 20 in the carrier 12 so that the mating tape connector 16 and tether connector 68 will be positioned flush with a relatively wider diameter portion (not shown) of the take-up reel in order to avoid impressions in tape 64 which could in turn cause "drop out" during playback or recording. The transparent leader on the inner end of tape 64 is of the same uniform width as the tape.

Figure 8:
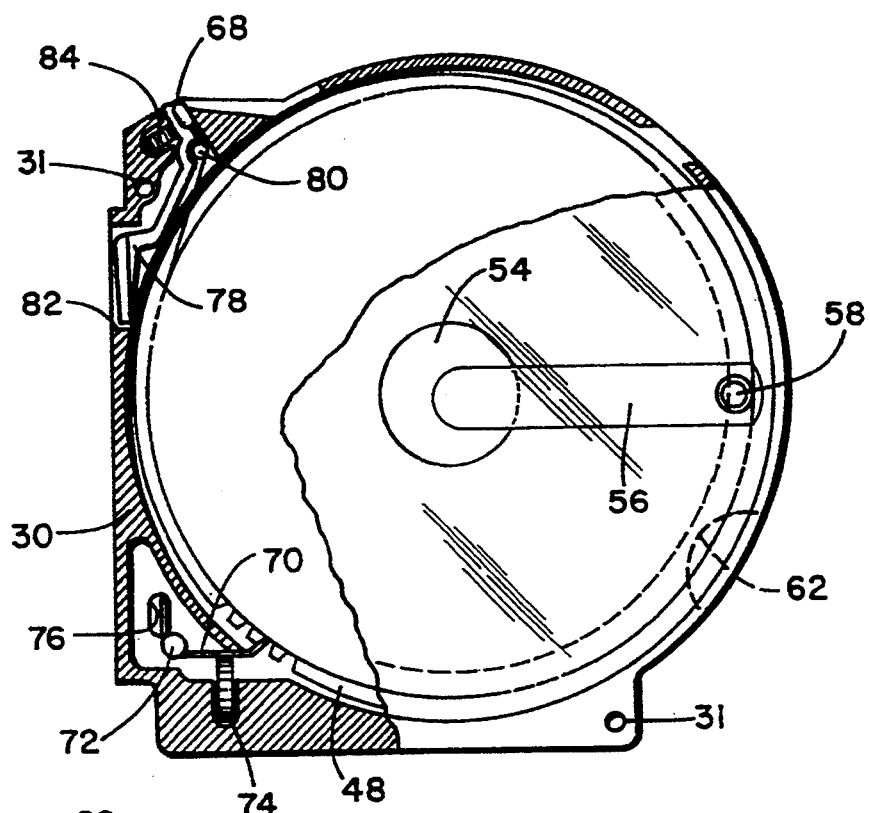
FIG. 8 is a horizontal section of the tape cartridge, partially cut away, showing the brake mechanism and tape connector/cartridge interlock before insertion into the carrier.
Figure 9:
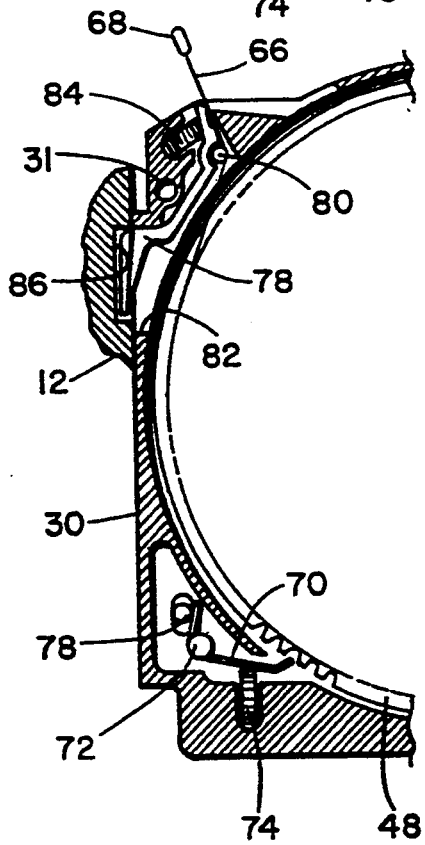
FIG. 9 is a partial horizontal section of the tape cartridge showing the brake mechanism and tape connector/cartridge interlock after insertion into the carrier.

Referring now to FIGS. 7-9, the tape cartridge 14 preferably includes an internal brake mechanism which normally secures the tape reel assembly 32 against unwinding movement unless properly inserted into carrier 12. In particular, a brake lever 70 is mounted for pivotal movement about a post 72 within a cavity in the bottom housing 30. One end of the brake lever 70 is normally urged by a spring 74 through an access opening and into locking engagement with the bottom gear flange 48, as best seen in FIG. 8. The other end of the brake lever 70 is turned outwardly and positioned over an access hole 76 in the bottom housing cover 30. When the tape cartridge 14 is inserted into carrier 12, pin 77 on the inside bottom of the carrier cam-actuates the brake lever 70 through hole 76 in order to release the tape reel assembly 32, as best seen in FIG. 9, so that it can turn freely in either direction in order that tape 64 can be freely wound or unwound from the tape cartridge as desired. It will thus be appreciated that the brake mechanism releases the tape reel assembly 32 responsive to insertion of the cartridge 14 into carrier 12. This comprises another important feature of the present invention.

In addition to an internal brake mechanism, the tape cartridge 14 includes a tape connector/carrier interlock mechanism which functions to releasably retain the tape connector 68 in a predetermined fixed position in housing 26 for mating engagement with the connector 16 upon insertion into carrier 12, and which also functions to cartridge and carrier after the tape connection has been established and connector 68 has been drawn out of housing 30. In particular, referring again to FIGS. 7-9, a horizontal arm 78 is supported for pivotal or rocking movement about one side of a guide pin 80, the other side of which adjoins a through passageway defining the tape path into and out of tape cartridge 14. One end of the arm 78 is movable into and out of the tape path, while the other end of the arm is movable through a slot 82 in the cartridge housing 26. As is best seen in FIG. 8, the arm 78 is normally biased by spring 84 such that one end holds the tape connector 68 in releasable clamped engagement within the tape guideway, while the other end of the arm is recessed within notch 82. This is necessary to constrain the female tape connector 68 against displacement as it fits down over the male tape connector 16 in the carrier 12. After the tape cartridge 14 has been inserted into carrier 12, with connectors 16 and 68 in mating engagement, then withdrawal of the connector 68 from the guideway releases arm 78 so that spring 84 can actuate the other end of the arm outwardly into locking engagement with a notch 86 in the carrier, as is best seen in FIG. 9. The arm 78 and associated surrounding notch 82 are preferably configured to come into stopping engagement to prevent the other end of the arm from moving too far across the tape path and interfering with movement of tape 64. This comprises another important feature of the present invention.

From the foregoing, it will thus be apparent that the present invention comprises a tape cartridge for use with a carrier in order to form a two-piece videocassette having several advantages over the prior art. One significant advantage involves a fact that the cartridge includes a supply of tape with a tape connector at one end which, upon insertion into the carrier, mates with a corresponding tether connector therein to establish connection between the supply reel and the take-up reel. Various locating and interlocking means are provided to assure proper positioning of the tape cartridges in the carrier and to secure the reel assembly and prevent inadvertent unwinding of the tape before the cartridge has been properly inserted within the carrier, as well as to prevent inadvertent removal of the cartridge from the carrier before the tape connector is fully withdrawn into the cartridge. The tape cartridge herein has the same tape capacity as a standard videocassette, but is compact for better space utilization. Other advantages will be evident to those skilled in the art.

Although particular embodiments of the invention have been illustrated in the accompanying drawings and described in the foregoing detailed description, it will be understood that the invention is not limited only to the embodiments disclosed, but is intended to embrace any alternatives, equivalents, modifications and/or rearrangement of elements falling within the scope of the invention as defined by the following claims.

What is claimed is:

1. A tape cartridge comprising:
    a tape supply reel having a first flange, a second flange and a central hub;
    a length of tape having first and second ends, the first end attached to the tape reel hub and wound thereon;
    a tape connector secured to the second end of the tape;
    a housing, having an interior, adapted to locate the tape supply reel for rotation within the housing;
    an opening in the housing;
    a single interlock arm pivotally mounted in the housing adapted for rotational movement, the interlock arm having a pivot point between a clamp end and a lock end for releasably securing the tape cartridge within an external housing, the arm being rotatable from a first clamp position to a second cartridge lock position within the external housing, the lock end in the second cartridge lock position extending from the housing through the opening;
    spring means for biasing the arm into the first clamp position;
    wherein the connector is held against the housing by the clamp end of the arm when the arm is in the first clamp position.

2. A tape cartridge comprising:
    a rotatable tape supply reel having a first flange, a second flange and a central hub;
    a length of tape having first and second ends, the first end attached to the hub and wound thereon;
    a tape connector secured to the second end of the tape;
    a housing, having an interior, adapted to locate the tape supply reel for rotation within the housing;
    an opening in the housing;
    a single interlock arm mounted in the housing adapted for pivotal movement between a first clamped position and a second cartridge lock position within an external housing, the arm having a pivot point between a first clamp end and second lock end for releasably securing the tape cartridge within the external housing;
    the first clamp end of the arm being in clamping engagement with the tape connector when the arm is in the first position, the second lock end of the arm extending from the housing through the opening when the arm is in the second cartridge lock position.

* * * * *

UNITED STATES PATENT AND TRADEMARK OFFICE
CERTIFICATE OF CORRECTION

PATENT NO. : 5,433,395
DATED : July 18, 1995
INVENTOR(S) : Turgeion, et. al.

It is certified that error appears in the above-indentified patent and that said Letters Patent is hereby corrected as shown below:

Title page, item [63], Related U.S. Application data, before "of Ser. No. 353,826,--" delete "continuation-in-part", and insert therefor --continuation--

In column 1, line 32, before the word "once", please delete "open", and insert therefor --opened--

In column 1, line 68, after the word "standard", please delete "a"

In column 2, line 26, before the words "is connected", please insert the word --and--

In column 5, line 31, before "connector 16", please delete the word "tape", and insert therefor --tether--

Signed and Sealed this

Twelfth Day of December, 1995

Attest:

BRUCE LEHMAN

*Attesting Officer*     *Commissioner of Patents and Trademarks*